United States Patent [19]

Voss et al.

[11] Patent Number: 5,720,337
[45] Date of Patent: Feb. 24, 1998

[54] FINNED THERMAL ENERGY STORAGE DEVICE

[75] Inventors: Mark G. Voss, Franksville; Alan P. Meissner, Racine, both of Wis.

[73] Assignee: Modine Manufacturing Company, Racine, Wis.

[21] Appl. No.: 688,431

[22] Filed: Jul. 30, 1996

[51] Int. Cl.$^6$ .................................. F28D 17/00
[52] U.S. Cl. ............... 165/10; 252/70; 252/48.1; 62/59; 62/430; 126/263.01
[58] Field of Search .................. 165/10, 104.12, 165/48.1; 62/59, 430; 126/263.03, 263.04, 263.05, 263.01; 252/70

[56] References Cited

U.S. PATENT DOCUMENTS

| | | | |
|---|---|---|---|
| 2,911,513 | 11/1959 | MacCracken | 165/10 X |
| 4,332,690 | 6/1982 | Kimura et al. | 165/10 X |
| 4,457,136 | 7/1984 | Nishizaki et al. | 165/104.12 X |
| 4,540,501 | 9/1985 | Ternes et al. | 252/70 |
| 4,922,998 | 5/1990 | Carr | 165/10 |
| 5,056,588 | 10/1991 | Carr | 165/10 |
| 5,082,582 | 1/1992 | Ames et al. | 165/10 X |
| 5,159,971 | 11/1992 | Li | 165/10 |

FOREIGN PATENT DOCUMENTS

| | | | |
|---|---|---|---|
| 0056597 | 4/1980 | Japan | 165/10 |
| 0058087 | 4/1982 | Japan | 165/10 |

OTHER PUBLICATIONS

Statement regarding prior sale of a device similar to the claimed device.

*Primary Examiner*—John Rivell
*Assistant Examiner*—Christopher Atkinson
*Attorney, Agent, or Firm*—Wood, Phillips, VanSanten, Clark & Mortimer

[57] ABSTRACT

A thermal energy storage device includes a sealed container having a wall defining a receptacle. An energy storage medium is disposed in the receptacle. The energy storage medium includes water and a gas capable of forming a gas hydrate with the water at a first transition temperature, the gas hydrate being capable of decomposing into water and the gas at a second transition temperature. Additionally, a fin extends from the wall inwardly to an inner region of the receptacle. The fin is in thermal communication with the wall, and defines a thermal energy transfer path between the wall and the inner region of the receptacle to facilitate the decomposition of the gas hydrate into water and the gas. The thermal energy storage device may also includes a mechanism positioned in the receptacle for providing mechanical movement within the thermal energy storage medium and mechanical contact between structural elements of the thermal energy storage device to facilitate the formation of the gas hydrate.

22 Claims, 2 Drawing Sheets

FINNED THERMAL ENERGY STORAGE DEVICE

BACKGROUND OF THE INVENTION

1. Technical Field

The present invention is directed toward thermal energy storage devices, and more particularly toward thermal energy storage devices using a gas hydrate as a thermal energy storage medium.

2. Background Art

Thermal energy storage devices are old in the art, and have been previously proposed, for example, as a means for shifting the power consumption demands of an air conditioning system from peak periods to off peak periods. More particularly, it has been suggested to incorporate in an air conditioning system a device which stores "cool" during off peak periods to be released during peak periods to assist in cooling a stream of air passing through the air conditioning system.

Conventionally, pure water has been suggested as a thermal energy storage medium for use in such a thermal energy storage device. However, pure water may not be a practical thermal energy storage medium because pure water has a relatively low transition temperature for the phase transformation from liquid water to solid ice. As a consequence, an air conditioning unit must operate below 32° F. (0 C.) if the cool is to be captured through the transition of pure water to ice.

As an alternative, it has been suggested that gas hydrates may be useful as a thermal energy storage medium (for example, see U.S. Pat. No. 4,540,501 to Ternes et al.). Gas hydrates are nonstoichiometric crystalline solid compounds that are also classified as clathrates. More particularly, gas hydrates are solid crystalline structures formed as gas molecules are trapped within an ice-type lattice. The trapped gas molecules lend stability to the lattice, permitting most hydrates to exist as a solid at temperatures well above the 32° F. transition temperature of ice to water, thus limiting the insulation required to preserve the cool once it is stored in the hydrate. Additionally, because of the higher transition temperature, less energy is required to produce the temperature differential required to reach the transition temperature. Moreover, the melting or decomposition of such gas hydrates requires a thermal energy input of approximately 120 Btu/pound, which is close to the thermal energy input required to decompose ice into pure water (144 Btu/pound). Thus, gas hydrates provide a "cool" storage capacity substantially similar to that of ice/water, but at a much lower insulation and energy cost.

The widespread use of gas hydrates has been limited, however, by the fact that when the hydrate decomposes totally, the initial reformation of the hydrate from a gas/water mixture requires a temperature significantly below the decomposition transition temperature. The difference between decomposition and formation transition temperatures may vary as much as 20° F., and may result in a formation transition temperature comparable to that of water into ice. The process of lowering the temperature of the gas/water mixture to induce hydrate formation is known as subcooling, and subcooling is considered to be undesirable because of the costs involved in carrying out such a procedure.

It has been suggested that the need for subcooling may be significantly reduced or eliminated by positioning a mechanism for providing mechanical movement within the gas/water mixture. For example, U.S. Pat. No. 4,922,998 to Carr suggests placing one or more metal, glass or ceramic balls in a sealed container filled with the gas/water mixture. The balls are placed in the container in such a way as to be freely moveable within the mixture in response to forces originating externally to the container being applied to the container or the balls. It is hypothesized that the movement of the balls is accompanied by mechanical contact between the balls and walls of the container, or between the balls themselves, and that the physical contact encourages hydrate crystal formation at the contact point.

However, the usefulness of a thermal energy storage device is not dependent solely upon the temperature at which the formation and decomposition of the thermal energy storage medium occurs. The rate at which the device releases/stores cool or transfers thermal energy is equally important to the perceived usefulness of the storage device. If the cool stored in the medium is not readily stored or releasable, i.e. thermal energy cannot be readily released or absorbed, the device may not be perceived to be practically or commercially useful.

For example, as the gas hydrate decomposes into the gas/water mixture in a device such as was disclosed by Carr, decomposition begins at the interface between the gas hydrate and the walls of the container. As the decomposition process continues, an outer layer of gas/water mixture may form surrounding a significantly larger inner core of gas hydrate. This outer layer of gas/water mixture may actually decrease the rate at which thermal energy can be exchanged with the inner core of gas hydrate. In this fashion, the cool that is stored in the inner core of gas hydrate may be insulated from further transfer of thermal energy from the fluid stream through the walls of the thermal energy storage device.

The present invention is directed toward overcoming one or more of the problems discussed above.

SUMMARY OF THE INVENTION

In one aspect of the present invention, a thermal energy storage device includes a housing for containing an energy storage medium having an external surface and an internal surface. An energy storage medium is disposed in the housing. The energy storage medium includes water and a gas capable of forming a gas hydrate with the water at a first transition temperature, and the gas hydrate capable of decomposing into water and the gas at a second transition temperature. Additionally, a fin extends into the energy storage medium. The fin is in thermal communication with the energy storage medium and the external surface of the housing to define a thermal energy transfer path between the energy storage medium and the external surface of the housing to facilitate the decomposition of the gas hydrate into water and the gas.

In another aspect of the present invention, a thermal energy storage device includes a sealed container having a wall defining a receptacle. An energy storage medium is disposed in the receptacle. The energy storage medium includes water and a gas capable of forming a gas hydrate with the water at a first transition temperature, the gas hydrate being capable of decomposing into water and the gas at a second transition temperature. Additionally, a fin extends from the wall inwardly to an inner region of the receptacle. The fin is in thermal communication with the wall, and defines a thermal energy transfer path between the wall and the inner region of the receptacle to facilitate the decomposition of the gas hydrate into water and the gas.

In a preferred form of the invention, the thermal energy storage device includes a plurality of fins.

In still another aspect of the invention, the thermal energy storage device also includes a mechanism positioned in the receptacle for providing mechanical movement within the thermal energy storage medium and mechanical contact between structural elements of the thermal energy storage device to facilitate the formation of the gas hydrate.

It is an object of the invention to provide a thermal energy storage device which allow for the rapid transference of thermal energy to and from the energy storage medium.

It is an object of the invention to provide a thermal energy storage device which is efficient to operate.

It is an object of the invention to provide a thermal energy storage device which is cost-effective to operate.

It is an object of the invention to provide a thermal energy storage device which is easy to assemble.

DETAILED DESCRIPTION OF THE PREFERRED EMBODIMENTS

The present invention is a thermal energy storage device using a mixture of gas and water capable of forming a gas hydrate as a thermal energy storage medium. The thermal energy storage device includes a wall which defines a receptacle in which the gas/water mixture is contained, and one or more protrusions or fins extending from the wall inwardly into the receptacle. The fins may facilitate the formation and decomposition of the gas hydrate as explained below in greater detail. The thermal energy storage device is useful, for example, in an air conditioning system to balance the power consumption demand of the air conditioning system between peak and off peak periods.

Figure 1:
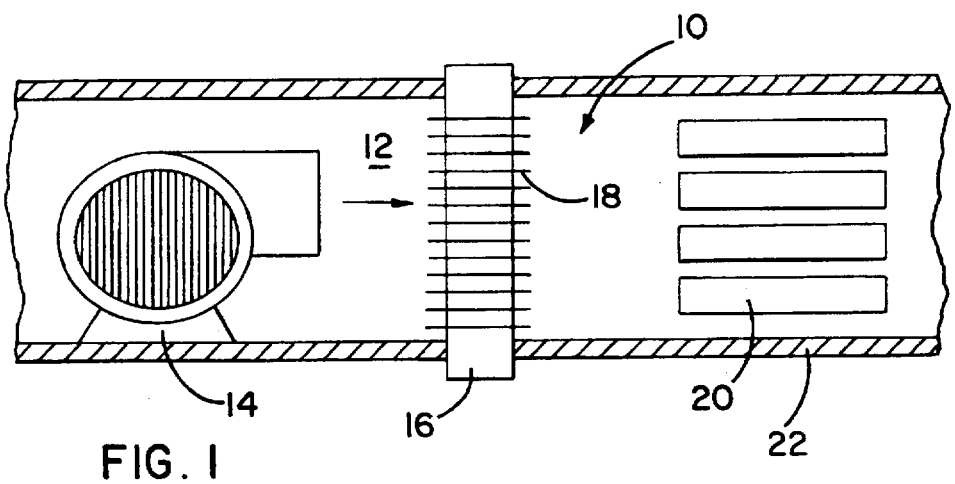
FIG. 1 is a schematic diagram of an air conditioning system configured to use a thermal energy storage device of the present invention.

An air conditioning system 10 capable of cooling a stream of air 12 is shown in FIG. 1. The system 10 includes a fan 14, a cooling element 16 with a plurality of fins 18 disposed thereon to facilitate thermal energy exchange between the cooling element 16 and the stream of air 12, and one or more thermal energy storage devices 20 according to a preferred embodiment of the present invention.

The fan 14 located near the left hand edge of FIG. 1 creates a pressure differential in a duct 22 such that air 12 is drawn from the left hand edge of FIG. 1 and forced toward the right hand edge. As the stream of air 12 moves from left to right through the duct 22, the stream of air 12 passes over the cooling element 16. The cooling element 16 is provided to decrease the temperature of the stream of air 12 prior to the stream of air 12 passing over the thermal energy storage devices 20.

The fan 14 and the cooling element 16 can be selected from any number of different devices generally known to those of ordinary skill in the art. The details of the thermal energy storage devices 20 are shown in FIGS. 2 and 3.

Figure 2:
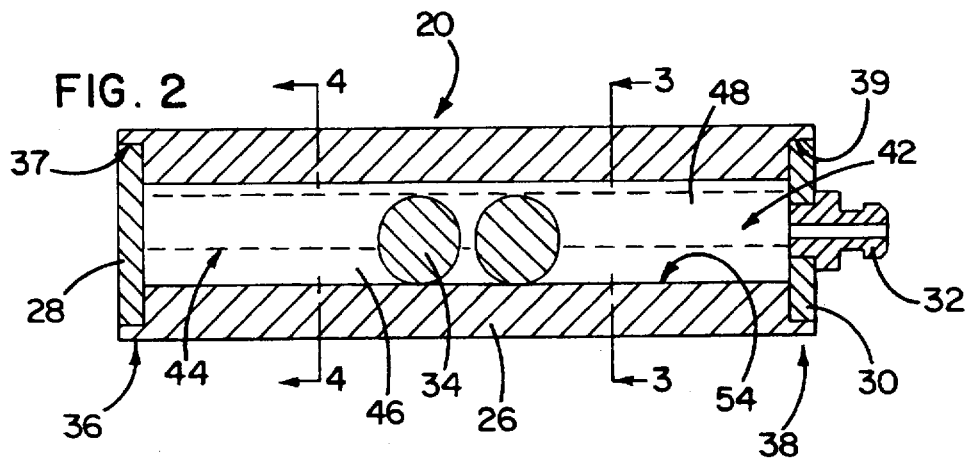
FIG. 2 is an enlarged cross-sectional view of an embodiment of a thermal energy storage device of the present invention.
Figure 3:
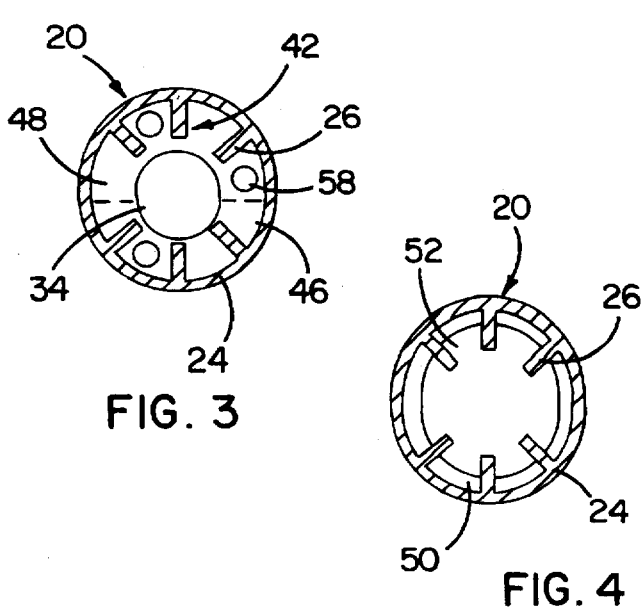
FIG. 3 is an enlarged cross-sectional view of the thermal energy storage device of FIG. 2 taken along line 3—3.

Referring to FIGS. 2 and 3, a preferred embodiment of the thermal energy storage device 20 of the present invention is shown in detail. The preferred mechanical elements of the thermal energy storage device 20 include a housing preferably defined by a tubular wall 24, the wall 24 with a plurality of fins 26 preferably formed integrally therewith, a base plate 28, a valve plate 30, a valve 32, preferably a Schraeder valve, and optionally a pair of moveable balls 34. All of the mechanical elements of the thermal energy storage device 20 are preferably fabricated from a material that is non-reactive with the gas hydrates used as a thermal energy storage medium in the thermal energy storage device 20.

The fins 26, preferably rectangular in cross-section, and the tubular wall 24 are preferably secured at a first end 36 to the base plate 28 and at a second end 38 to the valve plate 30. To facilitate the attachment of the base plate 28 to the tubular wall 24 and the fins 26, a first shoulder 37 is machined into the tubular wall 24 and the fins 26 at the end 36. Similarly, a second shoulder 39 is machined into the tubular wall 24 and the fins 26 at the end 38 to facilitate the attachment of the valve plate 30. In this embodiment of the present invention, the thermal energy storage device 20 is generally cylindrical in external appearance, although the external surface may be dimpled to improve thermal energy transfer between the thermal energy storage device 20 and the stream of air 12.

Figure 5:
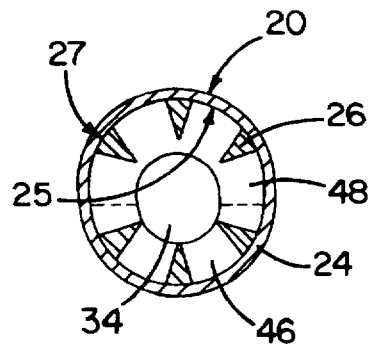
FIG. 5 is an enlarged cross-sectional view of an alternative embodiment of the thermal energy storage device of the present invention having a wall and a plurality of fins formed separately from the wall and attached to the wall.

In an alternative embodiment of the present invention, the fins 26 and the tubular wall 24 can be formed separately, as shown in FIG. 5. In this embodiment of the invention, the fins 26, triangular in cross-section, are first attached along a lengthwise edge 27 to an internal surface 25 of the tubular wall 24. The fins 26 are preferably formed such that the shoulders 37, 39 are defined by the ends (not shown) of the fins 26 and the internal surface 25 of wall 24.

Figure 6:
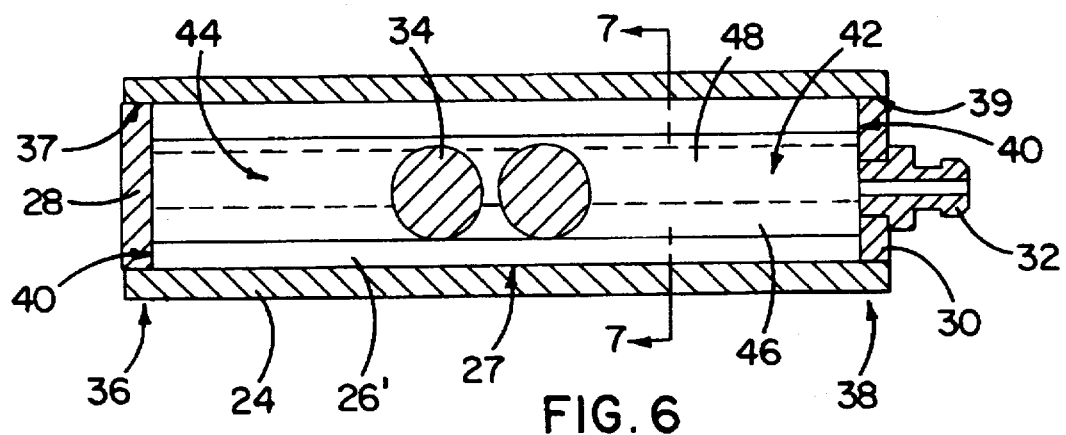
FIG. 6 is an enlarged cross-sectional view of another alternative embodiment of the thermal energy storage device of the present invention having a wall and a serpentine fin formed separately from the wall and attached to the wall.
Figure 7:
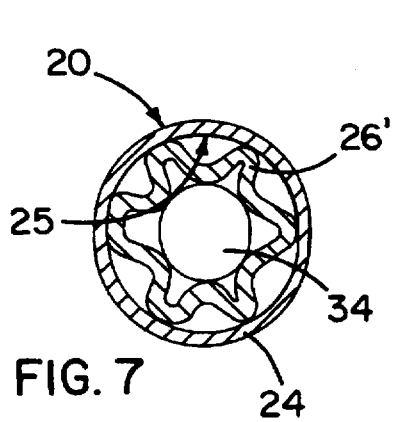
FIG. 7 is an enlarged cross-sectional view of the thermal energy storage device of FIG. 6 taken about line 7—7.

In still another alternative embodiment of the present invention, a single, serpentine fin 26' formed separately from the tubular wall 24 is used, as shown in FIGS. 6 and 7. Similar to the embodiment of the invention shown in FIG. 5, the fin 26' is attached at one or more points along the internal surface 25 of the tubular wall 24. Likewise, the ends 40 of the fin 26' and the internal surface 25 of the tubular wall 24 define the shoulders 37, 39 which facilitate the attachment of the base plate 28 and the valve plate 30 to the tubular wall 24 and the fin 26'.

Figure 9:
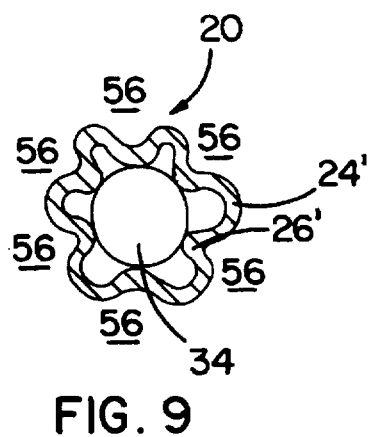
FIG. 9 is an enlarged cross-sectional view of the thermal energy storage device of FIG. 8 taken about line 8—8.
Figure 8:
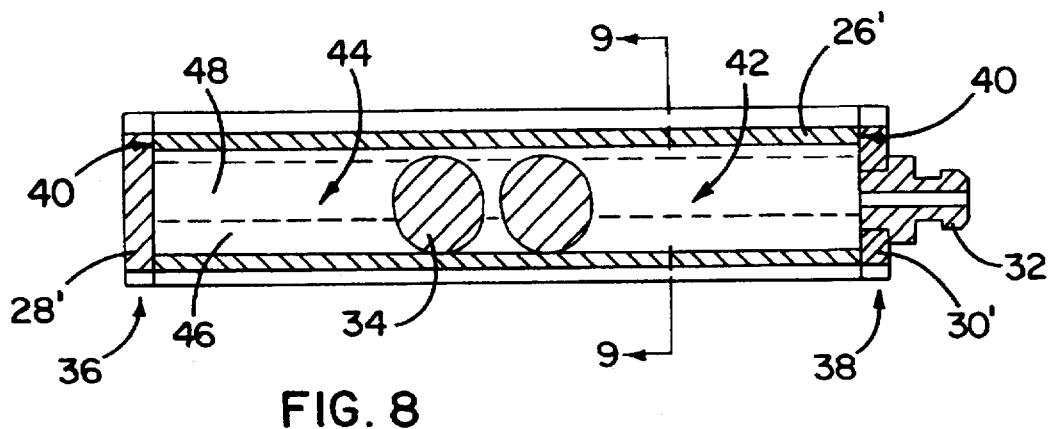
FIG. 8 is an enlarged cross-sectional view of still another alternative embodiment of the thermal energy storage device of the present invention having a serpentine wall supporting a pair of balls disposed therein.

In still a further embodiment of the present invention, the fin 26' is formed integrally with the wall 24', as shown in FIGS. 8 and 9. In this embodiment, the base plate 28' and the valve plate 30', attached at ends 36 and 38 of the thermal energy storage device 20 to ends 40 of the fin 26', are formed to conform to the contours of the fin 26', thus providing channels 56 through which the stream of air 12 can pass through while passing around the thermal energy storage device 20.

The fins 26, the tubular wall 24, the base plate 28 and the valve plate 30 define an internal receptacle 42 with the fins 26 projecting radially inward into the receptacle 42. The balls 34 may optionally be positioned within the receptacle 42 to provide mechanical movement within the thermal energy storage medium and mechanical contact between structural elements of the thermal energy storage device 20 as is known (see, for example, U.S. Pat. No. 4,922,998 to Carr, the complete disclosure of which is hereby incorporated by reference). In fact, additional balls 58 may be disposed between the fins 26 to assist in providing the mechanical movement within the storage medium and mechanical contact between structural elements of the thermal energy storage device 20. The valve 32 is disposed through the valve plate 30, and provides a sealable passage for selective access between the receptacle 42 and the external environment.

A mixture 44 of water 46 (preferably in a state wherein it is saturated with its own vapor) and a gas 48 (preferably in a state wherein the liquid form of the gas is saturated with the vapor form of the gas) capable of forming a hydrate with the saturated water 46 is sealed under suitable pressure in the receptacle 42. Under a first combination of transition temperature and transition pressure (or first transition point), the saturated gas/water mixture 44 can form a gas hydrate. Under a second combination of transition temperature and transition pressure (or second transition point), the gas hydrate formed under the first combination of transition temperature and transition pressure can endothermically decompose into the saturated gas/water mixture 44. Typically, the first transition temperature is less than or equal to the second transition temperature.

The transition points for the decomposition of a number of gas hydrates are known in the art (see, for example, U.S. Pat. No. 4,922,998 to Carr), so it should be understood that there are a wide variety of pressures, gasses and hydrates which could be used within the scope of this invention depending upon the desired operating characteristics.

Preferably, the desired saturated gas 48 and saturated water 46 are placed into the receptacle 42 of the thermal energy storage device 20 in a ratio of about 1 mole gas to 8 to 17 moles of water. The exact ratio required depends on the nature of the hydrate to be formed and the system requirements.

The fins 26 and the saturated gas/water mixture 44 are thought to cooperate to facilitate the rate of endothermic decomposition of the gas hydrate formed from the saturated gas/water mixture 44 into the mixture 44 of the saturated gas 48 and the saturated water 46. Particularly, it is theorized that the penetration of the fins 26 into the innermost regions of the storage device 20 provides a thermal energy transfer path to those portions of the hydrate radially removed from the tubular wall 24 so as to facilitate the more uniform and rapid decomposition of the hydrate over time.

Figure 4:
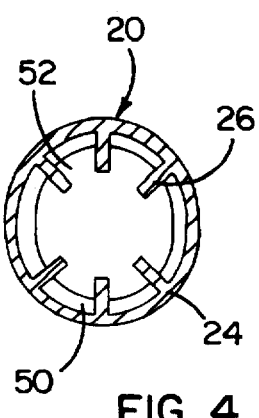
FIG. 4 is an enlarged cross-sectional view of the thermal energy storage device of FIG. 2 taken along line 4—4 at a time where a gas hydrate retained within the thermal energy storage device has partially decomposed back into a gas/water mixture.

More particularly, as the gas hydrate decomposes back into the saturated gas/water mixture 44, the saturated gas/water mixture 44 may form in an outer layer 50 surrounding an inner core of hydrate 52, as shown in FIG. 4. The layer 50 separates the inner core 52 from a direct thermal energy transfer relationship with the tubular wall 24 of the thermal energy storage device 20. By providing the fins 26, a thermal energy transfer path may be established with the inner core 52 whereby thermal energy transfer with these regions occurs even after the layer 50 of saturated gas/water mixture 44 as been established at the tubular wall 24. Additionally, the protrusion of the fins 42 into the gas hydrate provides additional surface area exposed to and in direct contact with the hydrate.

It is further theorized that the penetration of the fins 26 into the inner regions of the saturated gas/water mixture 44 may facilitate the rapid formation of the gas hydrate from the saturated gas/water mixture 44. For example, by providing additional surface area to and thermal energy transfer paths within the mixture 44, the fins 26 prevent an outer layer of gas hydrate, which commonly forms first, from preventing the formation of the gas hydrate at the inner regions of the receptacle 42.

It is also theorized that the internal edges 54 of the fins 26 may facilitate the rapid formation of the gas hydrate from the saturated gas/water mixture 44 by restricting the movement of the balls 34, 58 within the receptacle 42. This restricted movement of the balls 34, 58 helps to ensure that the balls 34, 58 will collide with and slide against each other and the other structural elements of the thermal energy storage device 20 as they move in the receptacle 42. As the points of contact have been theorized to be the sites of nucleation initiating gas hydrate formation, the significant probability that collisions and sliding contacts will occur enhances the efficiency of operation of such a system. It is further theorized that the increased number of collisions and increased contact period caused by restraining the balls 34, 58 using the fins 26 will cause an increase in nucleation sites, and a corresponding increase in the first transition temperature of the saturated gas/water mixture 44 to gas hydrate.

While the preferred embodiment of the present invention shows a configuration of six fins 26, the present invention also includes the possibility of arrangements having more or less than six fins 26. Furthermore, while the fins 26 are shown with substantially rectangular and triangular cross-section, the fins 26 may be of other cross-sectional shape as may be necessary, for example, to strengthen the fin 26 to better withstand the conditions of fabrication, operation, and/or to further increase the surface area of the fins 26. Additionally, in those embodiments of the present invention wherein the fin or fins 26 are formed separately from the tubular wall 24, the fin 26 may be of a different material than the tubular wall 24 with a different thermal energy transfer resistance than the tubular wall 24, which may be selected to provide a more balanced and uniform thermal energy transfer through the body of the thermal energy storage device than if the fins 26 and the tubular wall 24 are made from the same type of material.

In operating the system 10, for example, to balance the power consumption demands of the system 10 to cool the stream of air 12, the fan 14 and the cooling element 16 are activated during an off peak period. As the stream of air 12 passes over the cooling element 16, the temperature of the stream of air 12 is decreased preferably to that of the first transition temperature of the saturated gas/water mixture 44 contained in the thermal energy storage device 20, or slightly below.

As the stream of air 12 passes over the thermal energy storage device 20, the balls 34, 58 within the thermal energy storage device 20 are caused to move by application of external forces to the thermal energy storage device 20 (as might occur, for example, in a moving vehicle), or to the balls 34, 58 (for example, through the use of an oscillating magnetic field). Through collisions and sliding contacts of the balls 34, 58 with each other and the structural elements of the storage device 20, such as the internal edges 54 of the fins 26, it is believed that multiple nucleation sites are developed for the formation of hydrate crystals throughout the saturated gas/water mixture 44. Additionally, the fins 26 extend or protrude into the receptacle 42, providing additional surface area and additional thermal energy transfer paths to the inner regions of the receptacle 42, thereby facilitating the formation of the hydrate in the inner regions of the mixture 44 even after the hydrate forms in those portions of the mixture 44 in contact with the inner surface 25 of the tubular wall 24. Hydrate formation continues preferably until all or substantially all of the saturated gas/water mixture 44 is transformed into gas hydrate.

During a peak period, the fan 14 is again activated. The cooling element 16 may or may not be activated at this time depending on the desired temperature of the stream of air 12 exiting the system 10. For example, with the cooling element 16 deactivated, the primary thermal energy exchange will occur with the thermal energy storage devices 20. Particularly, the stream of air 12 flowing across the thermal energy storage devices 20 will transfer thermal energy to the thermal energy storage devices 20 via the tubular wall 24 and the fins 26 to the gas hydrate contained within the storage devices 20. The fins 26 cause the thermal energy to be transferred even to the portions of the gas hydrate radially removed from the tubular wall 24 of the thermal energy storage device 20. The exchange of thermal energy between the stream of air 12 and the gas hydrate causes the temperature of the stream of air to be decreased, without activation of the cooling element 16. While the decrease in temperature of the stream of air 12 may not be as great as with the cooling element 16 activated, a significant shifting of the power consumption away from the peak period can be achieved.

Alternatively, the cooling element 16 can be activated to pre-cool the stream of air 12 passing over the thermal energy storage devices 20 such that the temperature of the stream of air 12 is at or slightly above the transition temperature for the transition of the gas hydrate into the saturated gas/water mixture 44. In this mode of operation, it may be possible to achieve lower temperatures for the stream of air 12 than with the cooling element 16 deactivated. However, as it is not necessary to operate the cooling element 16 at its full cooling capacity, the power consumption of the system 10 during the peak period is still reduced, resulting in a power consumption savings.

Significantly, the enhanced thermal energy exchange path provided by the fins promotes rapid absorption or rejection of thermal energy by the gas hydrate. Consequently, whether the system is operating to cool a fluid stream or to form hydrate crystals for cool storage, its operation is considerably faster than that of system heretofore known. Still other aspects, objects, and advantages of the present invention can be obtained from a study of the specification, the drawings and the appended claims.

We claim:

1. A thermal energy storage device comprising:
a housing for containing an energy storage medium having an external surface and an internal surface;
an energy storage medium disposed in the housing, the energy storage medium including water and a gas capable of forming a gas hydrate with the water at a first transition temperature, and the gas hydrate capable of decomposing into water and the gas at a second transition temperature; and
a fin extending into the energy storage medium, the fin in thermal communication with the energy storage medium and the external surface of the housing to define a thermal energy transfer path between the energy storage medium and the external surface of the housing to facilitate the decomposition of the gas hydrate into water and the gas.

2. The thermal energy storage medium according to claim 1, wherein the fin extends from the internal surface.

3. The thermal energy storage medium according to claim 1, wherein the fin is defined at least in part by the internal surface.

4. A thermal energy storage device comprising:
a sealed container having a wall defining a receptacle;
an energy storage medium disposed in the receptacle, the energy storage medium including water and a gas capable of forming a gas hydrate with the water at a first transition temperature, and the gas hydrate capable of decomposing into water and the gas at a second transition temperature; and
a fin extending from the wall inwardly to an inner region of the receptacle, the fin in thermal communication with the wall and defining a thermal energy transfer path between the wall and the inner region of the receptacle to facilitate the decomposition of the gas hydrate into water and the gas.

5. The thermal energy storage device according to claim 4, further comprising means positioned in the receptacle for providing mechanical movement within the thermal energy storage medium and mechanical contact between structural elements of the thermal energy storage device to facilitate the formation of the gas hydrate.

6. The thermal energy storage device according to claim 5, wherein the fin is disposed between the wall and the means for providing mechanical movement and mechanical contact to restrict movement of the means for providing mechanical movement and mechanical contact within the receptacle.

7. The thermal energy storage device according to claim 6, wherein the means for providing mechanical movement and mechanical contact comprises a ball.

8. The thermal energy storage device according to claim 7, wherein the fin has an inwardly facing end disposed inwardly from the wall, and the inwardly facing end restricts movement of the ball within the receptacle.

9. The thermal energy storage device according to claim 4, further comprising a plurality of fins angularly spaced along the wall relative to the fin.

10. The thermal energy storage device according to claim 4, wherein the fin is formed integrally with the wall.

11. The thermal energy storage device according to claim 4, wherein the fin has a substantially rectangular cross-section.

12. The thermal energy storage device according to claim 4, wherein the fin has a substantially triangular cross-section.

13. The thermal energy storage device according to claim 4, wherein:
the wall has an internal surface which defines the receptacle; and
the fin is attached to the internal surface and extends therefrom inwardly into the receptacle.

14. The thermal energy storage device according to claim 13, wherein the fin is serpentine.

15. A thermal energy storage device comprising:
a sealed container having a wall defining a receptacle;

an energy storage medium disposed in the receptacle, the energy storage medium including water and a gas capable of forming a gas hydrate with the water at a first transition temperature, and the gas hydrate capable of decomposing into water and the gas at a second transition temperature;

a plurality of fins extending from the wall inwardly to an inner region of the receptacle, the plurality of fins in thermal communication with the wall and defining a plurality of thermal energy transfer paths between the wall and the inner region of the receptacle to facilitate the decomposition of the gas hydrate into water and the gas; and means positioned in the receptacle for providing mechanical movement within the thermal energy storage medium and mechanical contact between structural elements of the thermal energy storage device to facilitate the formation of the gas hydrate;

wherein the plurality of fins are spaced along the wall to restrict the movement of the means for providing mechanical movement and mechanical contact within the receptacle.

16. The thermal energy storage device according to claim 15, wherein the means for providing mechanical movement and mechanical contact comprises a ball.

17. The thermal energy storage device according to claim 16, wherein the fins each have an inner end disposed inwardly from the wall, and the inner ends restrict the movement of the ball within the receptacle.

18. The thermal energy storage device according to claim 17, wherein at least two of the plurality of fins are spaced along the wall such that the inner ends of the at least two of the plurality of fins are spaced from each other to accommodate the ball therebetween and to guide the movement of the ball in the receptacle.

19. The thermal energy storage device according to claim 16, wherein the wall is substantially circular in cross-section, the plurality of fins are angularly spaced and radially inwardly extending, and the inner ends of the at least two of the plurality of fins are spaced radially from each other to accommodate the ball therebetween.

20. The thermal energy storage device of claim 15, wherein the plurality of fins are formed integrally with the wall.

21. The thermal energy storage device of claim 15, wherein the plurality of fins are substantially rectangular in cross-section.

22. The thermal energy storage device of claim 15, wherein the plurality of fins are substantially triangular in cross-section.

* * * * *